Figure 1:
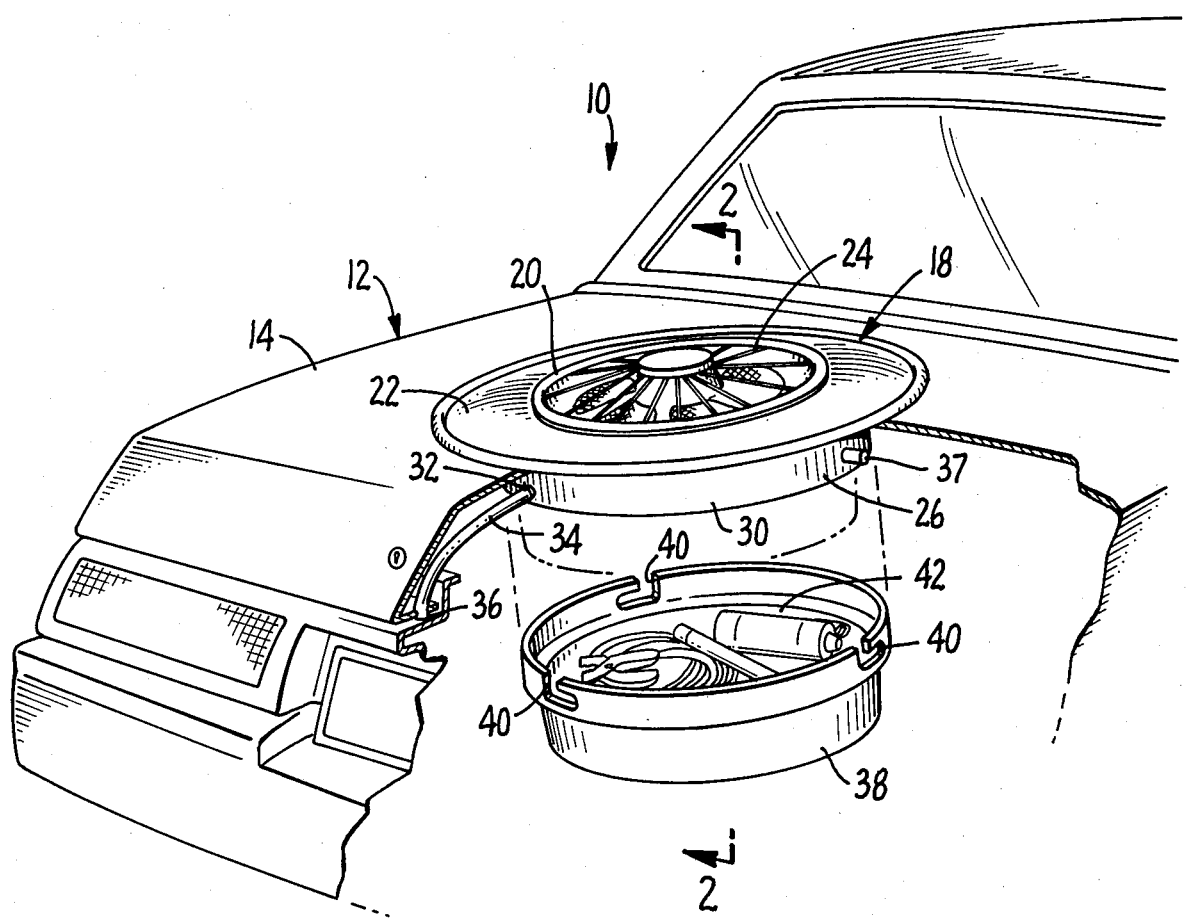

United States Patent [19]

Vogt

[11] 4,227,737
[45] Oct. 14, 1980

[54] AUTOMOTIVE TRUNK DECK LID ACCESSORY

[76] Inventor: Calvin R. Vogt, P.O. Box 94, Lafayette, Calif. 94549

[21] Appl. No.: 960,081

[22] Filed: Nov. 13, 1978

[51] Int. Cl.³ .............................................. B62D 25/10
[52] U.S. Cl. .................................... 296/76; 224/42.13
[58] Field of Search ................................ 296/76, 1 R; 224/42.46 R, 42.41, 42.43, 42.44, 309, 311, 42.13, 42.14

[56] References Cited

U.S. PATENT DOCUMENTS

| | | | |
|---|---|---|---|
| 1,592,466 | 7/1926 | Morgan | 296/76 |
| 2,109,665 | 3/1938 | Fergueson | 224/42.13 |

Primary Examiner—John J. Love
Assistant Examiner—John A. Carroll

[57] ABSTRACT

A styling accessory which comprises a simulated automobile wheel, mounts in the deck of the lid of the storage trunk of an automobile. The underside of the wheel decoration has an integral reservoir for collecting water and a drainage conduit drains collected water from the reservoir. A casing depends from the reservoir and is removably fastened to it to define a storage compartment immediately underneath the reservoir for storage of road safety items such as road flares, booster cables, flat tire sealer and emergency police signal.

3 Claims, 2 Drawing Figures

AUTOMOTIVE TRUNK DECK LID ACCESSORY

SUMMARY OF THE INVENTION

Many decorative styling accessories are available for imparting a custom, luxury appearance to automobiles of standard design. One such decoration involves the placement of a simulated spare wheel on the deck of the lid of the storage trunk of an automobile. Although such accessories have been well received, their installations have been such that the simulated nature of the decorations is quite evident.

The present invention is an automotive styling accessory which presents a realistic appearance, one with greater "depth" and, therefore, one which enhances the appearance of the automobile to a greater degree. It also is a functional storage compartment.

To this end, an opening is cut, or otherwise formed, in the deck of the lid of the trunk of an automobile and a simulated wheel is sealed in the opening. The decoration has an integral reservoir which collects any rain water passing through the simulated wheel. A drainage conduit discharges the water collected in the reservoir at the periphery of the trunk lid outside the gasketed seal between lid and vehicle body. A casing shaped to define an auxiliary storage compartment depends from the reservoir. It serves as a convenient place to store important, but seldom used, road safety articles, such as flares, booster cables, flat tire sealer, emergency signal devices, etc.

Figure 2:
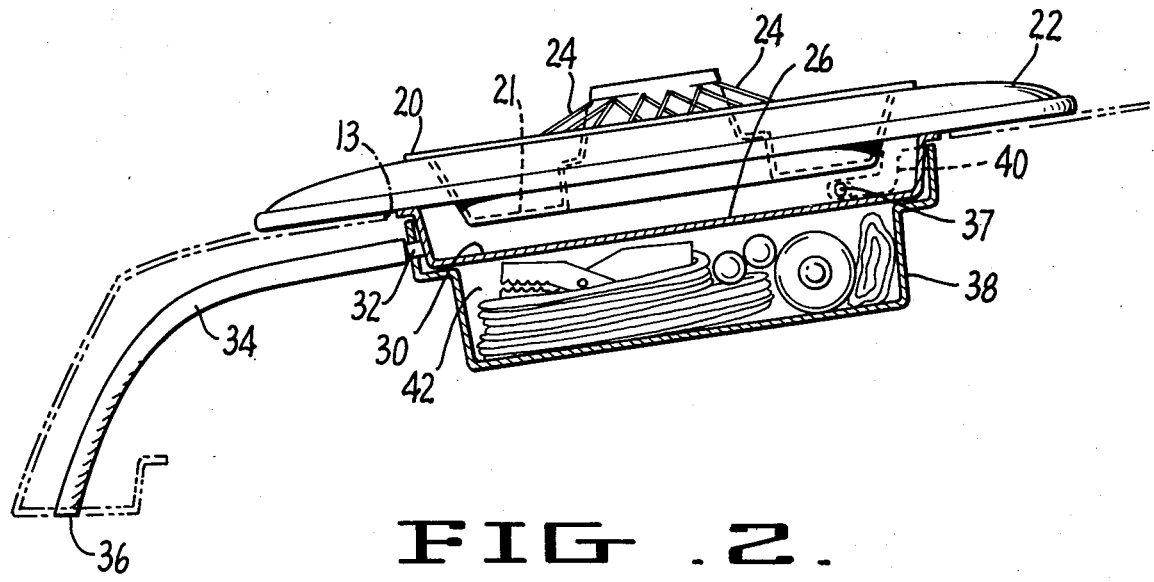

In the drawings:

FIG. 1 is an exploded perspective view, partly in section, showing the invention installed in the deck of the lid of the storage trunk of an automobile; and FIG. 2 is a sectional view taken on the line 2-2 of FIG. 1 looking in the direction of the arrows.

The drawings show the rear portion 12 of an automobile 10. Mounted within opening 13 in the center of the deck 14 of the lid enclosing the storage trunk 16 of the automobile is a simulated automobile wheel accessory 18. The decorative accessory 18 includes a central spoked hub 20 which corresponds in configuration and appearance to the wheels (not shown) of the automobile 10. Connected around the central hub 20 is an annular tire cover 22. This tire cover may be in the same, or complimentary, color as the body of the automobile 10. As shown in the drawings, the central hub 20 contains a plurality of wire spokes 24, but may be of other construction consistent with the configuration of the wheels of the automobile. As shown most clearly in FIG. 2, the central hub 20 includes a perforated well 21 that extends below the plane of the deck 14 to simulate one of the regular wheels of the vehicle.

The tire cover 22 is provided with a pan-like reservoir 26 that extends inwardly of and is sealed to the opening 13 cut in the deck 14 underneath the simulated wheel decoration 18. The reservoir 26 catches and collects any water, such as rain water or water sprayed onto the automobile in a car wash, that passes through the central spoked hub 20 and perforated well 21. By reason of the slope of the deck 14, the reservoir cants so the water will collect in its rearward portion 30. At this point, a short tube 32 serves as an outlet for the reservoir. A conduit 34, preferably flexible tubing attaches to the tube 32 and conducts the rain water to a peripheral edge 36 of the lid where it is discharged beyond the usual flexible gasketed seal between the lid and vehicle body.

The reservoir 26 has a pair of pins 37,37 which, together with tube 32, removably support a storage casing 38. In the preferred embodiment of the invention shown in the drawings, the storage casing 38 is generally pan-shaped. Three L-shaped slots 40,40 formed in the upper edge of the casing 38 permit the casing to be inserted over pins 37,37 and tube 32 and then rotated to hang therefrom. In this manner the casing 38 depends from the reservoir 26 and defines an auxiliary storage compartment 42. Any type of articles can be stored in the compartment 42, but it is especially well adapted for the storage of road safety items that are needed infrequently, such as road flares, booster cables, flat tire sealer, emergency signals, etc.

Various modifications of the described embodiment may be apparent and within the scope of the invention defined in the following claims:

I claim:

1. A decorative accessory for mounting upon an opening formed in the deck of the storage trunk lid of an automobile comprising
   a central wheel hub overlying said opening and a connected tire cover mounted upon the deck;
   a reservoir sealed to said opening for catching water passing through the central wheel hub;
   conduit means draining the reservoir to the periphery of said lid; and
   a casing removably depending from the reservoir to define a storage compartment between it and the reservoir.

2. The decorative accessory of claim 1 wherein the central wheel hub extends in part below the plane of the deck.

3. A decorative accessory for mounting upon an opening formed in the deck of the storage trunk lid of an automobile comprising
   a central wheel hub overlying said opening and a connected tire cover mounted upon the deck;
   a reservoir sealed to said opening for catching water passing through the central wheel hub;
   conduit means draining the reservoir to the periphery of said lid;
   a casing removably depending from the reservoir to define a storage compartment between it and the reservoir; and
   a plurality of mounting pins on the outside periphery of the reservoir and a plurality of corresponding L-shaped slots on the upper edge of the casing for attachment upon the pins.

* * * * *